Sept. 8, 1964  M. MOLLICK  3,147,610
INSTRUMENT FOR RECORDING TEMPERATURE AND METHOD
OF CALIBRATION THEREOF
Filed Aug. 8, 1962  2 Sheets-Sheet 2

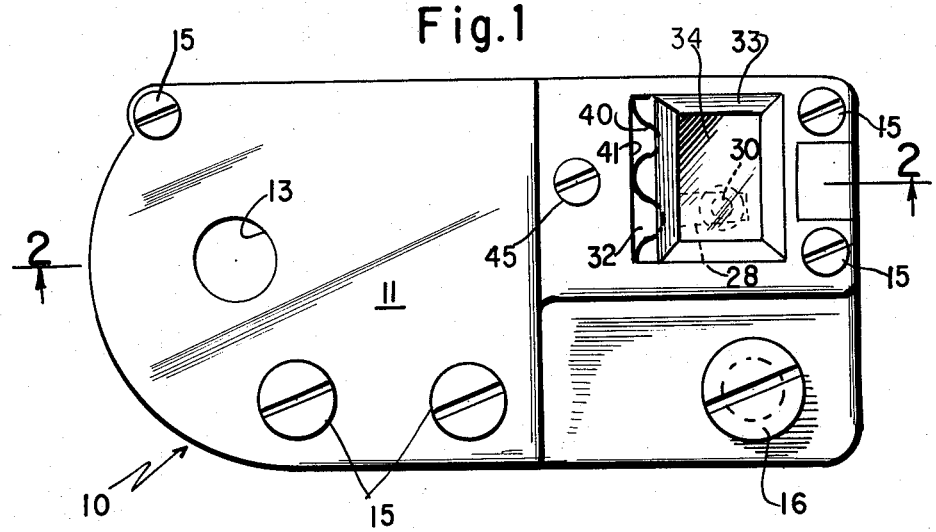
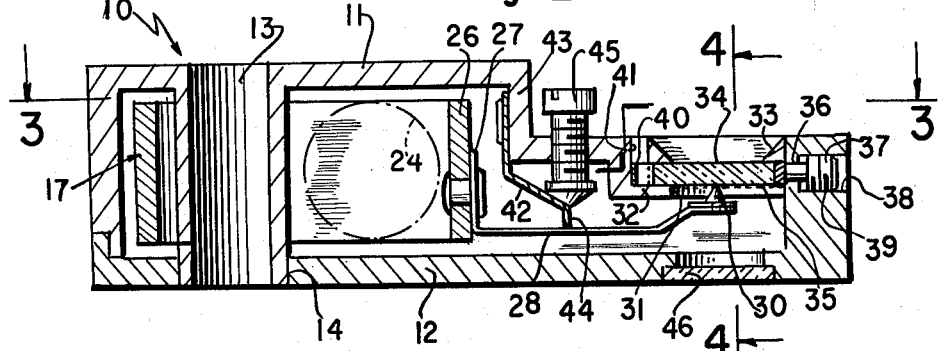
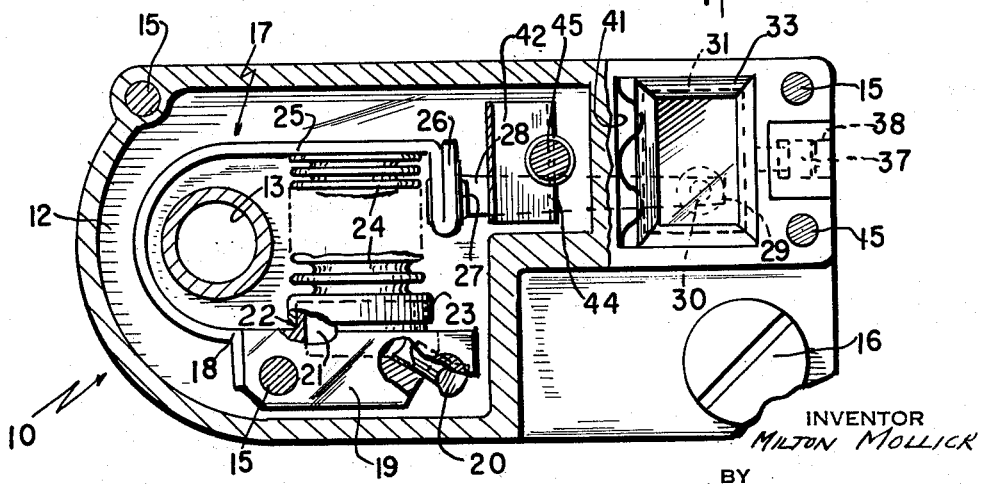

INVENTOR
MILTON MOLLICK
BY
Robertson & Smythe
ATTORNEYS

United States Patent Office 3,147,610
Patented Sept. 8, 1964

3,147,610
INSTRUMENT FOR RECORDING TEMPERATURE AND METHOD OF CALIBRATION THEREOF
Milton Mollick, Allentown, Pa., assignor to Ametek, Inc., New York, N.Y., a corporation of Delaware
Filed Aug. 8, 1962, Ser. No. 215,595
14 Claims. (Cl. 73—1)

The present invention relates to temperature recorders, and particularly to a new and improved maximum-minimum temperature recorder of relatively small size and of rugged construction, and to a method of calibrating the same.

In extended storage or travel of articles, material and the like, it is often desirable to know the maximum and minimum temperatures to which the articles and material and the like have been subjected, particularly if the articles or material have been damaged during the period, which damage might have been caused by temperatures encountered.

The principal object of the present invention is to provide a maximum-minimum temperature recorder of relatively small size and rugged construction capable of accurately recording the maximum and minimum temperatures encountered by an object, articles, materials or devices with which it may be associated.

Another object of the invention is to provide such a maximum-minimum temperature recorder in which the construction is capable of withstanding rough usage including severe shocks.

Another object of the invention is to provide such a recorder that will produce a permanent recording that cannot easily be altered.

Still another object of the invention is to provide such a recorder that is capable of being calibrated with facility.

Still another object of the invention is to provide such a maximum-minimum temperature recorder that is readable by use of special devices and which eliminates nonlinearity.

In one aspect of the invention, a two-part housing may enclose a U-shaped spring member, one leg of which forms a mounting therefor within said housing. The mounting leg may be hollow in order to act as a reservoir for an organic liquid that entirely fills a bellows mounted between the two legs of the U-shaped spring and is adapted to expand and contract in response to temperature variations.

In another aspect of the invention, the free end of the unsupported leg of the U-shaped spring may support an arm at the far end of which a stylus may be fixed for contact with, and movement over a glass plate having deposited thereon a surface coating such as electrodeposited aluminum adapted to record the extent of the path of travel of the stylus.

In still another aspect of the invention, means may be provided for permitting the stylus to lie in contact with the coated glass surface or to be easily removed therefrom.

In still another aspect of the invention, the coated glass plate may be mounted in the housing for transverse movement relative to the movement of the stylus incident to temperature variations. In this way, the instrument may be readily calibrated by subjecting it to accurate temperatures with the stylus in contact with the coated glass and then effecting transverse movement of the glass.

In still another aspect of the invention, means may be provided for facilitating the reading of the scratched glass when the instrument is placed beneath an optical viewer of a microscope.

The above, other objects and novel features of the invention will become apparent from the following specification and accompanying drawings which are merely exemplary.

In the drawings:

FIG. 1 is a top plan view of a maximum-minimum temperature recorder to which the principles of the invention have been applied;

FIG. 2 is a sectional elevational view taken substantially along line 2—2 of FIG. 1;

FIG. 3 is a sectional plan view taken substantially along line 3—3 of FIG. 2;

Figure 4:
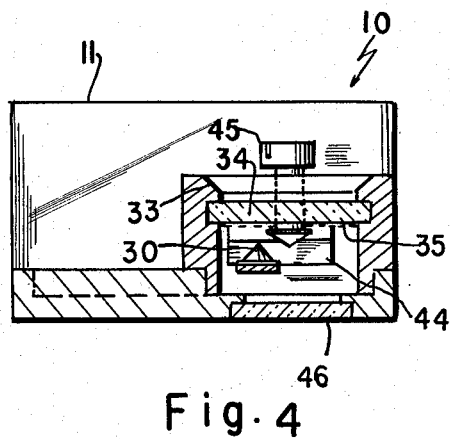
FIG. 4 is a sectional elevational view taken substantially along line 4—4 of FIG. 3.

Referring to the drawings and particularly to FIGS. 1, 2 and 3, the principles of the invention are shown as applied to a two-part housing 10 including an upper part 11 and a lower part 12. The parts 11 and 12 may be made of any material, although if it is preferred that light be transmitted into the interior of the housing 10, either or both parts may be made of a transparent plastic such as polycarbonate resin. The upper part includes a hollow, cylindrical sleeve 13, the lower end of which snugly fits within an opening 14 in the lower part 12. Both upper and lower parts are fastened together by screw means 15, and a screw 16 may be employed to mount the device in any desired location in relation to materials or devices of which the maximum and minimum temperatures to which they have been subjected are desired to be known.

A U-shaped spring element 17 may include as one of its legs 18 a hollow reservoir 19 having a tube 20 leading from the exterior to the interior thereof. The reservoir 19 may be open at 21, such opening being surrounded by a flange 22 that mates with, and is soldered or otherwise hermetically sealed to, one end 23 of a bellows 24. The upper end of the bellows 24 may abut the under surface of another leg 25 of the U-shaped spring 17. The reservoir 19 and bellows 24 may be filled with an organic liquid commonly used in bellows devices of this sort. It may be introduced through the tube 20, after which the outer end of tube 20 is sealed off.

The free end 26 of leg 25 may have fixed to it one end 27 of an arm 28. The free end 29 of arm 28 may have fixed to it a stylus 30 for a purpose to be described. The stylus point may be extremely fine and of an order to produce a scribed line having a thickness of about 0.0001 of an inch. Of course, stylus points of grosser order may be employed.

The upper part 11 may be provided with a through passage 31 having a shelf 32 on one side thereof. A frame 33 may support a transparent glass 34 on the bottom surface of which may be a coating 35 of electrodeposited aluminum or the like. The frame 33 may include a stud 36 on which a rotatable threaded sleeve 37 may be journaled but held against axial movement relative to stud 36. The threaded sleeve 37 may engage threads 38 within a passage 39 extending through one end wall of part 12 of housing 10. A spring 40 may be located on shelf 32 between frame 33 and a wall 41 of part 11 that defines the rear extremity of the shelf 32. The construction and arrangement of the parts are such that turning threaded sleeve 37 causes the frame 33 and glass 34 to slide forwardly or backwardly along shelf 32 against the action of spring 40 and in the direction of the longitudinal axis of arm 28.

A resilient element 42 may have one end fixed to a wall 43 of part 11, and its free end 44 may extend transversely across, and in close proximity to, arm 28. A screw 45 may be threaded into a tapped hole in part 11, and in one position its inner end can force the free end 44 of element 42 into engagement with arm 28 to thereby remove the stylus 30 from engagement with the coated surface 35 of glass 34. In another position it permits the resiliency of arm 28 to effect engagement between the stylus 30 and the coated surface 35.

Should the lower part 12 be made of a material other than a transparent material, a window 46 may be provided therein for admitting light from a source, as will be explained later.

Calibration of the instrument may be effected by adjusting screw 45 to remove stylus 30 from the aluminized surface 35, and turning the threaded sleeve 37 so that the glass 34 is in one of its extreme positions. A suitable medium may be brought to the desired lowest temperature required and stabilized at said temperature for five minutes, after which the instrument may be immersed in said medium and permitted to stabilize for a suitable period. The screw 45 may then be adjusted to permit the stylus 30 to contact the coated surface 35, and sleeve 37 may be turned to cause transverse motion of glass 34 relative to the direction of movement of stylus 30 by the action of bellows 24. This produces a scribed line 40A in the aluminized surface 35 representing the low temperature limit of the recording instrument.

The temperature of the instrument is raised a predetermined amount in a suitable medium, say 50° F., with stylus 30 still in engagement with surface 35, such scribing a longitudinal line 40B. The medium and instrument are stabilized for another suitable period, after which threaded sleeve 37 is turned in the opposite direction to produce another scribed line 40C substantially parallel to the first and representing the 50° F. increment on the aluminized coating 35. This process may be repeated throughout the desired range of temperatures to be recorded so that a scale of temperatures of known increments is formed on the aluminized coating 35 on glass 34.

Figure 6:
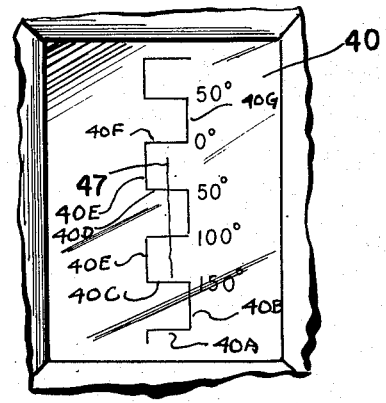
FIG. 6 is an enlarged view of the scale and scratched recorded line.
Figure 5:
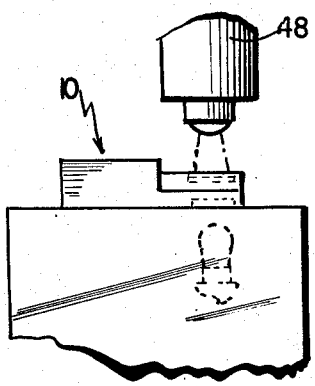
FIG. 5 is a fragmentary view of an arrangement showing the instrument in position to be read through a microscope.

With the calibrated instrument mounted in close proximity to material of which the maximum-minimum temperatures to which it is subjected are desired to be known, with the stylus 30 set to engage the coated surface 35, and sleeve 37 adjusted to locate stylus 30 substantially midway of the longitudinal parallel scribed lines 40E, 40G representing the path of the stylus at the two extremities of the glass slide position, a line 47 (FIG. 6) will be scribed transversely of the parallel scale lines 40A, etc., during the period the material is subjected to temperature variations. By locating the instrument beneath an optical viewer 48 of a microscope or similar means, it will be possible accurately to determine the maximum-minimum temperatures to which the material or articles have been subjected.

Figure 7:
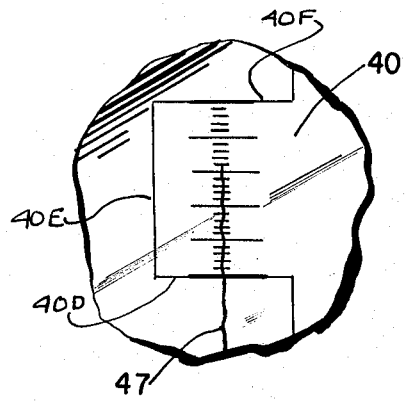
FIG. 7 is a fragmentary enlarged view of the reticule for reading the recorder.

Such can be accomplished, for example, as seen in FIG. 7, by focusing a suitably divided reticule (50 increments) on a single 50° F. interval. The ends of the 50 increments are matched with the scribed lines 40D, 40F, and then the temperature at the end of line 47 can be read. The temperature at the other extreme can be read in a similar manner. Thus, linearity is not important because only the 50° interval of the ends of the line 47 need to be examined.

Although the various features of the new and improved maximum-minimum temperature recorder have been shown and described in detail to fully disclose one embodiment of the invention, it will be evident that changes may be made in such details and certain features may be used without others without departing from the principles of the invention.

What is claimed is:

1. In a maximum-minimum temperature recorder, a support; a U-shaped spring having one of its legs anchored to said support and the other leg thereof free; arm means connected to said free leg; stylus means mounted on said arm means at its end opposite that connected to said free leg; a recording surface mounted on said support in position to cooperate with said stylus; and temperature responsive means between the legs of said U-shaped spring.

2. In a maximum-minimum temperature recorder, a support; a U-shaped spring having one of its legs anchored to said support and the other leg thereof free; arm means connected to said free leg; stylus means mounted on said arm means at its end opposite that connected to said free leg; a recording surface mounted on said support in position to cooperate with said stylus; temperature responsive means between the legs of said U-shaped spring; and means for moving said stylus into and out of cooperating position relative to said recording surface.

3. In a maximum-minimum temperature recorder, a support; a U-shaped spring having one of its legs anchored to said support and the other leg thereof free; arm means connected to said free leg; stylus means mounted on said arm means at its end opposite that connected to said free leg; a recording surface mounted on said support in position to cooperate with said stylus; temperature responsive means between the legs of said U-shaped spring; and means for adjusting said recording surface transversely of the path of travel of said stylus incident to the operation of said temperature responsive means.

4. In a maximum-minimum temperature recorder, a support; a U-shaped spring having one of its legs anchored to said support and the other leg thereof free; arm means connected to said free leg; stylus means mounted on said arm means at its end opposite that connected to said free leg; a recording surface mounted on said support in position to cooperate with said stylus; temperature responsive means between the legs of said U-shaped spring; means for moving said stylus into and out of cooperating position relative to said recording surface; and means for adjusting said recording surface transversely of the path of travel of said stylus incident to the operation of said temperature responsive means.

5. In a maximum-minimum temperature recorder, a support; a U-shaped spring having one of its legs hollow, forming a reservoir, and anchored to said support, the other leg being free; arm means connected to said free leg; stylus means mounted on said arm means at its end opposite that connected to said free leg; a recording surface mounted on said support in position to cooperate with said stylus; and bellows means between said legs, in communication with said reservoir and abutting said free leg.

6. In a maximum-minimum temperature recorder, a support; a U-shaped spring having one of its legs hollow, forming a reservoir, and anchored to said support, the other leg being free; arm means connected to said free leg; stylus means mounted on said arm means at its end opposite that connected to said free leg; a recording surface mounted on said support in position to cooperate with said stylus; bellows means between said legs, in communication with said reservoir and abutting said free leg; and means for moving said stylus into and out of cooperating position relative to said recording surface.

7. In a maximum-minimum temperature recorder, a support; a U-shaped spring having one of its legs hollow, forming a reservoir, and anchored to said support, the other leg being free; arm means connected to said free leg; stylus means mounted on said arm means at its end opposite that connected to said free leg; a recording surface mounted on said support in position to cooperate with said stylus; bellows means between said legs, in communication with said reservoir and abutting said free leg; and means for adjusting said recording surface transversely of the path of travel of said stylus incident to the operation of said bellows means.

8. In a maximum-minimum temperature recorder, a support; a U-shaped spring having one of its legs hollow, forming a reservoir, and anchored to said support, the other leg being free; arm means connected to said free leg; stylus means mounted on said arm means at its end opposite that connected to said free leg; a recording surface mounted on said support in position to cooperate with said stylus; bellows means between said legs, in communication with said reservoir and abutting said free leg; means for moving said stylus into and out of cooperating position relative to asid recording surface; and means for adjusting said recording surface transversely of the path of travel of said stylus incident to the operation of said bellows means.

9. In a maximum-minimum temperature recorder, a support; a U-shaped spring having one of its legs anchored to said support and the other leg thereof free; arm means connected to said free leg; stylus means mounted on said arm means at its end opposite that connected to said free leg; a frame; a glass recording element having an aluminized surface adapted to be supported by said frame in cooperative position relative to said stylus; means for adjustably moving said glass recording element transversely of the path of movement of said stylus; and temperature responsive means between the legs of said U-shaped spring.

10. In a maximum-minimum temperature recorder, a support; a U-shaped spring having one of its legs anchored to said support and the other leg thereof free; arm means connected to said free leg; stylus means mounted on said arm means at its end opposite that connected to said free leg; a frame; a glass recording element having an aluminized surface adapted to be supported by said frame in cooperative position relative to said stylus; means for adjustably moving said glass recording element transversely of the path of movement of said stylus; temperature responsive means between the legs of said U-shaped spring; and means for moving said stylus into and out of cooperating position relative to said recording surface.

11. In a maximum-minimum temperature recorder, a support; a U-shaped spring having one of its legs anchored to said support and the other leg thereof free; arm means connected to said free leg; stylus means mounted on said arm means at its end opposite that connected to said free leg; a frame; a glass recording element having an aluminized surface adapted to be supported by said frame in cooperative position relative to said stylus; means for adjustably moving said glass recording element transversely of the path of movement of said stylus; and bellows means between said legs and abutting said free leg.

12. In a maximum-minimum temperature recorder, a support; a U-shaped spring having one of its legs anchored to said support and the other leg thereof free; arm means connected to said free leg; stylus means mounted on said arm means at its end opposite that connected to said free leg; a frame; a glass recording element having an aluminized surface adapted to be supported by said frame in cooperative position relative to said stylus; means for adjustably moving said glass recording element transversely of the path of movement of said stylus; bellows means between said legs and abutting said free leg; and means for moving said stylus into and out of cooperating position relative to said recording element.

13. The method of calibrating a maximum-minimum temperature recorder having a stylus adapted to be moved over and in contact with a recording surface incident to temperature variations, which recording surface itself is movable transversely relative to the movement of said stylus incident to temperature changes, which method comprises subjecting said recorder to a medium at a predetermined temperature for a predetermined time to stabilize the position of said stylus with said stylus in contact with said recording surface; moving said stylus and recording surface relative to each other transversely of the path of stylus movement incident to temperature changes to produce a reference line scribed on said recording surface; changing the temperature of said medium to a predetermined value and retaining it at said value for a predetermined time to stabilize the position of said stylus; and repeating said step of relatively moving said recording surface and stylus transversely of the path of stylus movement incident to temperature variations to produce another scribed line on said recording surface.

14. The method of calibrating a maximum-minimum temperature recorder having a stylus adapted to be moved over and in contact with a recording surface incident to temperature variations, which recording surface itself is movable transversely relative to the movement of said stylus incident to temperature changes, which method comprises subjecting said recorder to a medium at a predetermined temperature for a predetermined time to stabilize the position of said stylus with said stylus in contact with said recording surface; moving said stylus and recording surface relative to each other transversely of the path of stylus movement incident to temperature changes to produce a reference line scribed on said recording surface; changing the temperature of said medium to a predetermined value and retaining it at said value for a predetermined time to stabilize the position of said stylus, repeating said step of relatively moving said recording surface and stylus transversely of the path of stylus movement incident to temperature variations to produce another scribed line on said recording surface, focusing a reticule on an interval between said lines scribed transversely of the line scribed by temperature changes, and reading the temperature concerned from the divisions of said reticule.

No references cited.